Nov. 3, 1925.  
A. W. PARKER  
1,560,305  
DEHYDRATOR  
Filed Aug. 28, 1924   3 Sheets-Sheet 3
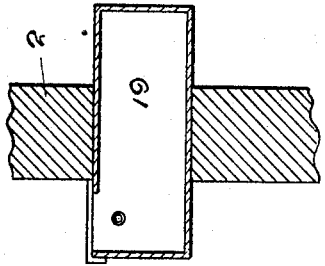
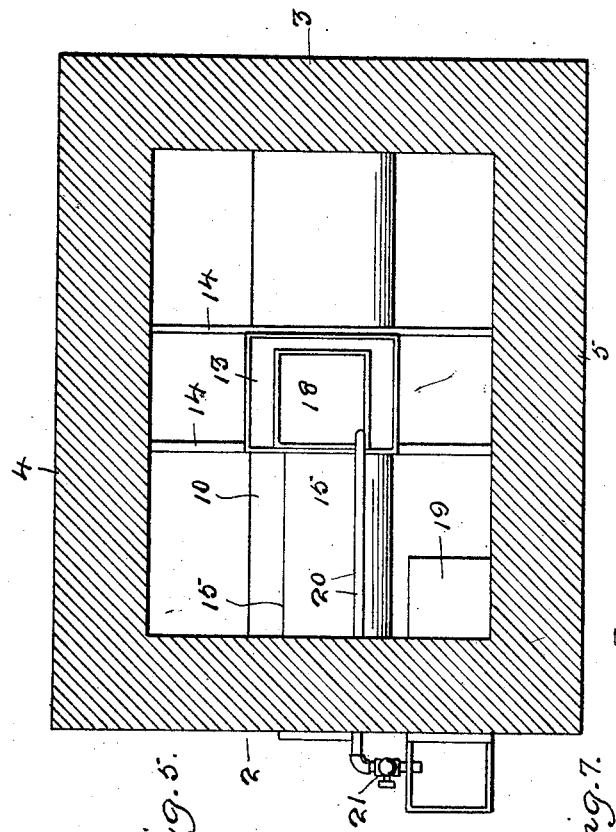
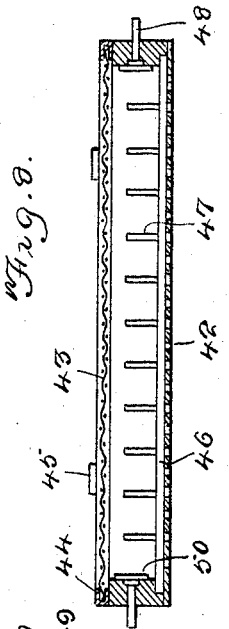
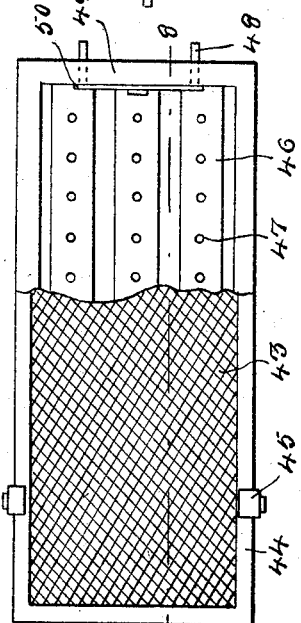
A. W. Parker,
INVENTOR Patented Nov. 3, 1925.

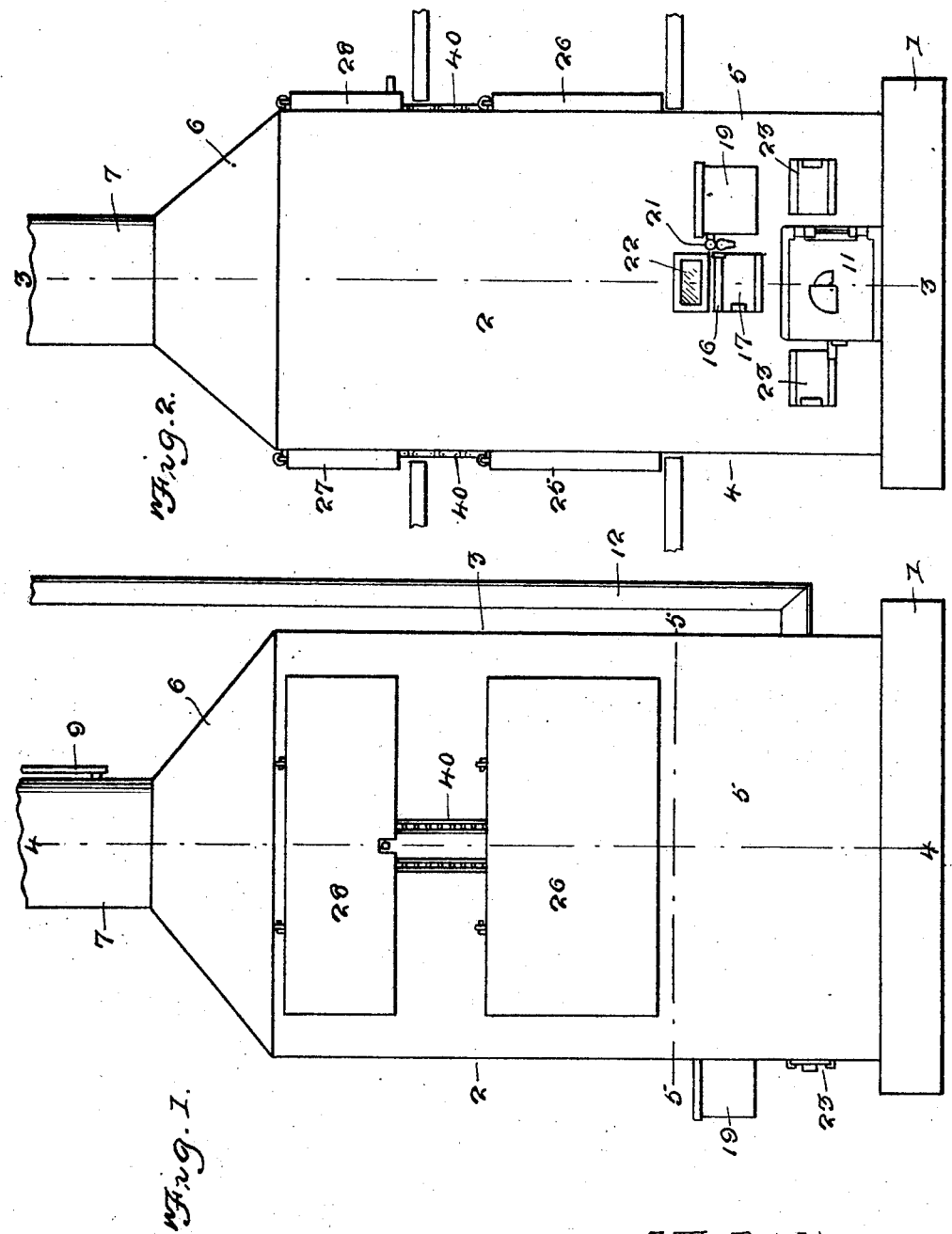

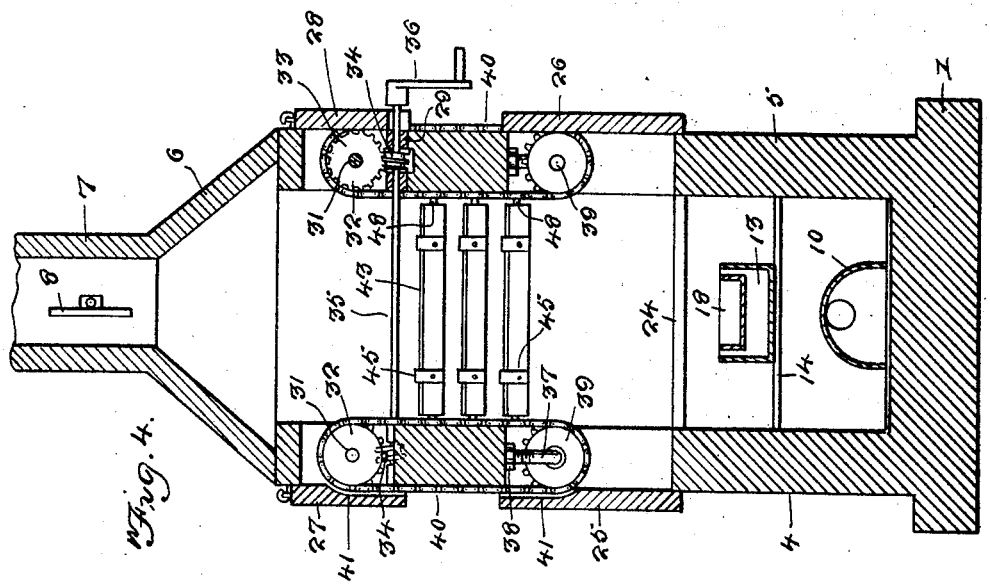
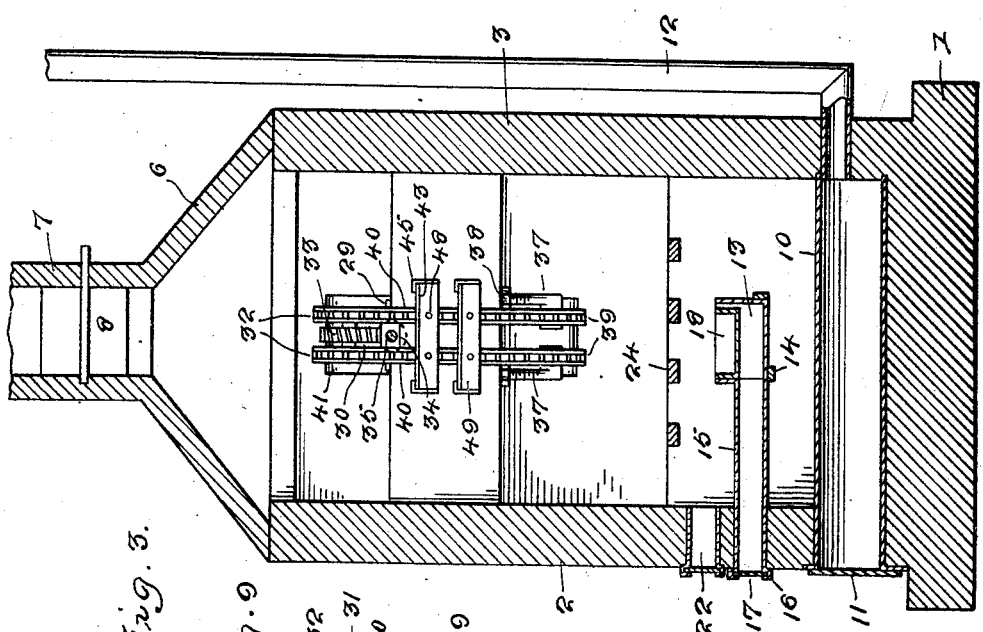

1,560,305

UNITED STATES PATENT OFFICE.

ARTHUR W. PARKER, OF MIDWEST, WYOMING, ASSIGNOR TO LLOYD A. PARKER, OF MIDWEST, WYOMING.

DEHYDRATOR.

Application filed August 28, 1924. Serial No. 734,767.

*To all whom it may concern:*

Be it known that I, ARTHUR W. PARKER, a citizen of the United States, residing at Midwest, in the county of Natrona and State of Wyoming, have invented new and useful Improvements in Dehydrators, of which the following is a specification.

This invention relates to dehydrators, and to that class adapted to dry fruits, vegetables and the like.

The primary object of the invention is to provide a dehydrator that will effectually dry fruits and vegetables in an expeditious manner and with such rapidity that they can be subjected to high temperatures without fermentation taking place, hence all the sugar as well as the original flavor is retained in the cured product, in fact, fruits such as prunes and peaches will take the form of a confection.

Another object of the invention is to provide a dehydrator that is extremely simple to operate, and one that is provided with trays adapted to contain the food products to be dried and said trays being associated with the dehydrator in a manner whereby they are released therefrom when the food products are in their dried state.

A further object is to provide a dehydrator consisting of apparatus that causes the heated air to be distributed equally throughout the hot air chamber thereof, such being made possible by evaporation of moisture which deprives the heated air of its sharpness thereby thoroughly drying the products with the minimum loss of weight.

A still further object is to provide trays provided with means for puncturing the food products so that the heated air will effectually penetrate the interior thereof.

With the above and other objects and advantages in view, the invention consists in the details of construction and arrangement to be hereinafter more fully described and claimed, and illustrated in the accompanying drawings, in which:—

Figure 1 is a side elevation of the dehydrator forming the subject matter of the present invention.

Figure 2 is a front view thereof.

Figure 3 is a sectional view taken on the line 3—3 of Figure 2.

Figure 4 is a sectional view taken on the line 4—4 of Figure 1.

Figure 5 is a sectional view taken on the line 5—5 of Figure 1.

Figure 6 is a detail fragmentary sectional view showing the surplus water heater which forms a portion of the invention.

Figure 7 is a top plan view of one of the trays.

Figure 8 is a sectional view taken on the line 8—8 of Figure 7.

Figure 9 is a detail fragmentary sectional view clearly disclosing some of the structure partially shown in Figure 3.

Referring to the drawings in detail, the reference numeral 1 indicates the base from which rises adjacent the marginal edge thereof the front wall 2, the rear wall 3 and the side walls 4 and 5, respectively. The top 6 is formed of converging walls inclined inwardly from the front, rear and side walls, and the walls of the top terminate to provide an opening whose marginal edge supports the draft casing 7 which is controlled by a valve 8 operated through the medium of a handle 9. Arranged adjacent the base and extending longitudinally through the dehydrator, there is a furnace 10 which is provided with an arcuate top to effectually throw off the heat therefrom. The furnace extends from the rear wall and passes through the front wall, where it is provided with a usual latch door 11. A flue 12 for the furnace projects through the rear wall 3 and then rises at right angles therefrom to terminate adjacent the top of the structure so the exhaust from the combustible materials of the furnace can in no manner mingle with the drying products.

An open top receptacle 13 is supported by a pair of transversely disposed rods 14 which are arranged slightly above the furnace. Leading from the open top receptacle there is an asbestos covered draft pipe 15 which extends through the front wall and is provided with guides 16 to accommodate a sliding door 17 which controls the amount of air desirable. The receptacle has its upper end open and receives therein, in a manner whereby there is sufficient air escape space upon three sides thereof, a water container 18 which may be termed the equalizer and temperer of the hot air of the furnace, the water in this container acting to supply moisture which is kept at a uniform temperature by the cold air from the receptacle to distribute the heated air equally throughout the space below the drying chamber, as well as the remaining portion of the dehydrator. This mentioned space below the drying chamber may be termed for distinction, the hot air chamber. A supply water heater, in the nature of an elongated receptacle 19 passes through the front wall, in juxta-position to the asbestos covered draft pipe and to one side thereof, as clearly shown in Figure 5 of the drawings, and a copper water conducting pipe 20 provided with a petcock 21 extends from the elongated receptacle to the water container 18 whereby this container will be supplied with heated water as required. A glass covered observation opening 22 is also formed in the front wall of the structure so that a thermometer (not shown) can be conveniently read from the exterior. Disposed upon opposite sides of the furnace door there are draft openings provided with sliding doors 23.

Traversing the structure and arranged between the hot air chamber and drying chamber there are boards 24 fixed at their ends to the side walls 4 and 5. The purpose of these boards will be apparent as the remaining elements are described.

The drying chamber is that portion of the structure which is arranged midway between the top and bottom thereof, and receives the food product to be dried. The side walls of the drying chamber are provided with elongated openings closed by depending hinged doors 25 and 26.

The loading chamber is disposed above the drying chamber and the converging walls of the top 6, and the side walls of the loading chamber are likewise provided with elongated openings closed by depending hinged doors 27 and 28.

Secured to the lower wall of the openings closed by the doors 27 and 28 midway the ends thereof, there are bearing blocks 29 from which rise spaced flat ears 30 formed with bearings to receive shafts 31 whose ends have each secured thereto a sprocket wheel 32, and also secured to each of the shafts 31 between the flat ears 30 there are worm gears 33 meshing with worms 34 which are fixed to the ends of the transverse shaft 35 as clearly shown in Figure 4 of the drawings, therefore the same shaft 35 operates both pair of sprocket wheels 32 through the medium of a hand crank 36 which is provided with a socket to receive one end of the shaft 35.

Depending from the upper wall of each of the openings closed by the doors 25 and 26 there are a pair of spaced stud shafts 37 having their upper ends threaded and provided with nuts 38 whereby the shafts can be adjusted with respect to the walls last mentioned and for a purpose that will be presently apparent. The lower ends of each pair of stud shafts are bent laterally to face each other, and rotatably mounted on these laterally bent ends there are sprocket wheels 39.

Trained over the sprocket wheels 32 and 39, respectively, there are endless chains 40 provided with open links and these chains can be adjusted to take up play therein as the occasion requires through the medium of the adjustably mounted stub shafts as will be readily apparent. The doors of each of the elongated openings are provided with recesses 41 to accommodate the chains as shown.

The trays for receiving the product to be dried are elongated in shape and uniform in size and these trays are each provided with a perforated bottom 42 and a sliding top 43 which is in the form of wire mesh having the edges thereof reenforced by channeled strips 44. The top 43 is held associated with the tray by angle shaped members 45 whose upper ends overlie the reenforcing strips of the side edges thereof and provide guides. A plurality of elongated strips 46 extend longitudinally within the trays and rest upon the bottom thereof. Equi-distantly spaced pins 47 rise from each of the elongated strips 46 and are adapted to receive singly the product to be dried, the pin puncturing the fruit or vegetable as the case may be so that the heat can be readily conveyed to the center to thoroughly dry the product. These trays are adapted to be associated with the endless chain in the manner shown in Figures 3 and 4 and for this purpose they are provided with a pair of projections or hangers 48 slidably passing through each end 49 and these projections or hangers are adapted to be received in the links of the endless chains. A leaf spring 50 is secured to the inner sides of the ends 49, midway its end and said leaf springs engage the inner ends of the projections or hangers 48 for retaining them in their outermost position. The projections or hangers being thus mounted whereby they can be conveniently inserted in the links of the chains to provide an adequate detachable connection between the trays and the chains.

The operation of the dehydrator forming the subject matter of the present invention is extremely simple and may be briefly described as follows:—

The drawings show a dehydrator forming the subject matter of the present invention, consisting of one tray conveying unit, but as many of these units as is consistent with the structure may be employed. The trays are filled with food products to be dried one piece on each pin 47, the top 43 is then placed in operative position and the trays inserted through the openings closed by the doors 27 and 28 into the loading chamber, the projections or hangers 48 are inserted in opposite links of the chain as shown and the crank is then turned to lower the tray a sufficient distance to provide room for another tray. This operation is continued until the drying chamber is full, the doors are then lowered and the food products to be dried are subjected to the drying elements of the hot air chamber. Some fruits such as Italian prunes require from twelve to fifteen hours to be dry cured, other fruits and vegetables according to their texture and amount of moisture they contain. When the products are thoroughly dried, the crank is turned to further lower the trays and they are dropped from the chains as the inner portion of the chains encircle the lower sprocket wheels to begin their upright journey. When the trays fall upon the finishing boards 24 the food products are examined to ascertain their condition and if any of the products are not adequately dried the trays can be left on the finishing boards until the desired dryness takes place.

Of course it must be understood that the structure of the dehydrator can be built to comply with the desired size, from three stories high to a much smaller size, depending upon the fruit belt in which the same is located.

While I have shown and described the preferred form of the invention, it is to be understood that I reserve the right to make such changes in the construction and arrangement as will not depart from the spirit of the invention or the scope of the subjoined claims.

Having described the invention, I claim:—

1. A dehydrator of the character described comprising a hot air chamber, a cold air conveying pipe extending from the exterior thereof into the hot air chamber, an open top receptacle formed on the inner end of the cold air conveying pipe, a water container support in the open top, means for conveying heated water to the container, and a drying chamber disposed above the hot air chamber as described.

2. A dehydrator of the character described comprising a hot air chamber, means arranged therein for equalizing and regulating the temperature of the air throughout the dehydrator, a drying chamber arranged above the hot air chamber, a loading chamber arranged above the drying chamber and depending hingedly secured doors adapted to cover elongated openings arranged in the side walls of the drying chamber and loading chamber, respectively.

3. A dehydrator of the character described comprising a base, front, rear and side walls rising therefrom, converging walls terminating to form an opening providing a top for the structure, a draft casing rising from the marginal edge of the opening, a plurality of hinged depending doors adapted to close elongated openings formed in the side walls, a tray conveying means extending between the elongated openings of each of the side walls and said doors being recessed to accommodate the conveying means.

4. A dehydrator of the character described comprising a hot air chamber, a drying chamber and a loading chamber, conveying means extending from the loading chamber into the drying chamber, trays associated with the conveying means, perforated bottoms formed on each tray, elongated strips arranged in said trays and resting upon the bottom thereof, pins rising from each of the elongated strips and being adapted to receive the food products singly, means projecting from the ends of each tray to be received by the conveying means, and said projecting means being spring held and slidably mounted in a manner whereby said trays can be detachably associated with the conveying means and automatically dropped therefrom.

5. A dehydrator of the character described comprising a loading chamber, a drying chamber, and a hot air chamber, said loading and drying chamber, respectively, being provided with elongated openings in the side walls thereof, bearing brackets secured to the lower walls of the openings of the loading chamber, shafts mounted for rotation in the bearing brackets, stub shafts depending from the upper wall of the openings of the drying chamber, sprockets on each of the mentioned shafts, endless chains trained over the sprockets, food product receiving members associated with the trays, and recessed doors closing the openings.

In testimony whereof I affix my signature.

ARTHUR W. PARKER.